(12) United States Patent
Morovic et al.

(10) Patent No.: US 10,694,076 B2
(45) Date of Patent: Jun. 23, 2020

(54) COLOR CALIBRATION

(71) Applicant: HEWLETT-PACKARD DEVELOPMENT COMPANY, L.P., Spring, TX (US)

(72) Inventors: Jan Morovic, London (GB); Peter Morovic, Sant Cugat del Valles (ES)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/337,631

(22) PCT Filed: Jan. 30, 2017

(86) PCT No.: PCT/US2017/015625
§ 371 (c)(1),
(2) Date: Mar. 28, 2019

(87) PCT Pub. No.: WO2018/140055
PCT Pub. Date: Aug. 2, 2018

(65) Prior Publication Data
US 2020/0036866 A1    Jan. 30, 2020

(51) Int. Cl.
*H04N 1/60* (2006.01)
(52) U.S. Cl.
CPC ........... *H04N 1/6008* (2013.01); *H04N 1/603* (2013.01)
(58) Field of Classification Search
None
See application file for complete search history.

(56) References Cited

U.S. PATENT DOCUMENTS

| 5,357,448 A | 10/1994 | Stanford |
| 7,034,968 B2 | 4/2006 | Bhaskar et al. |

(Continued)

OTHER PUBLICATIONS

Zeng, H., et al, An Expanded Neugebauer Model for Printer Color Formation, 1998, <http://scholarworks.rit.edu/cgi/viewcontent.cgi?article=1359&context=other>.

*Primary Examiner* — Dung D Tran
(74) *Attorney, Agent, or Firm* — HP Inc. Patent Department

(57) ABSTRACT

A method of calibrating an area coverage representation of a color. A first area coverage of a Neugebauer primary in an area coverage representation of a color is determined based on a plurality of reference area coverage parameters for the Neugebauer primary, wherein each reference area coverage parameter in the plurality of reference area coverage parameters corresponds to a respective colorant deposition subsystem in a plurality of colorant deposition subsystems. A second area coverage of the Neugebauer primary is determined based on the plurality of reference area coverage parameters and a plurality of calibration parameters for the Neugebauer primary, wherein each calibration parameter in the plurality of calibration parameters corresponds to a respective colorant deposition subsystem in the plurality of colorant deposition subsystems. A plurality of calibrated area coverage parameters are determined for the Neugebauer primary in the area coverage representation of the color based on the plurality of reference area coverage parameters, the plurality of calibration parameters and a difference in area coverage between the first area coverage and the second area coverage.

17 Claims, 5 Drawing Sheets

(56) References Cited

U.S. PATENT DOCUMENTS

| | | | |
|---|---|---|---|
| 7,110,142 B2* | 9/2006 | Mestha | H04N 1/6033 |
| | | | 358/1.9 |
| 8,964,247 B2 | 2/2015 | Shin et al. | |
| 9,367,772 B2 | 6/2016 | Maccari | |
| 2005/0083540 A1 | 4/2005 | Hersch et al. | |
| 2012/0105878 A1* | 5/2012 | Aharon | H04N 1/6033 |
| | | | 358/1.9 |
| 2014/0225953 A1 | 8/2014 | Robinson et al. | |
| 2016/0034795 A1 | 2/2016 | Morovic et al. | |
| 2016/0086059 A1 | 3/2016 | Morovic et al. | |
| 2017/0013174 A1* | 1/2017 | Morovic | H04N 1/6055 |

* cited by examiner

COLOR CALIBRATION

BACKGROUND

A printer system may be associated with a color space defined by one or more colorants available to the printer system for deposition or application to a print medium. An example of a colorant color space is the Cyan, Magenta, Yellow, BlacK (CMYK) color space, wherein four variables are used in a subtractive color model to represent respective quantities of colorants. A calibration method may be employed to ensure that the printer system deposits a correct quantity of colorant to accurately represent a given color. Examples of colorants include inks, dyes, pigments, paints, toners and powders.

BRIEF DESCRIPTION OF THE DRAWINGS

Various features and advantages of the present disclosure will be apparent from the detailed description which follows, taken in conjunction with the accompanying drawings, which together illustrate, by way of example only, features of the present disclosure, and wherein.

DETAILED DESCRIPTION

Figure 1:
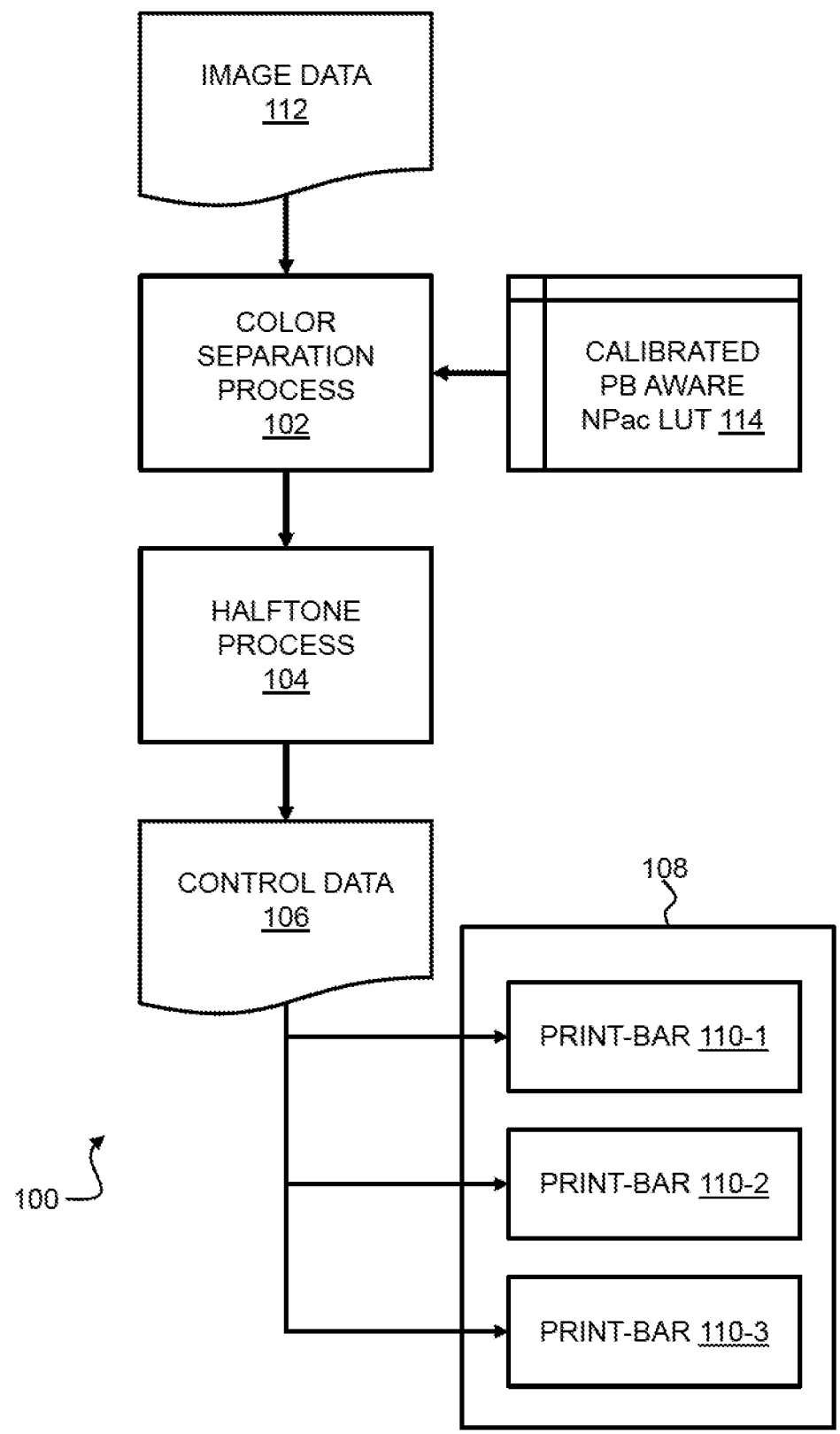
FIG. 1 is a schematic diagram showing an imaging pipeline in accordance with an example.

In the following description, for purposes of explanation, numerous specific details of certain examples are set forth. Reference in the description to "an example" or similar language means that a particular feature, structure, or characteristic described in connection with the example is included in at least that one example, but not necessarily in other examples.

Color calibration may be used to adjust the color response of a printer system, such that it more accurately corresponds to a desired color to be printed. In this respect, color calibration may be used to calibrate a color-mapping or color separation process by which a first representation of a given color defined in terms of a first color space is mapped to a second representation of the same color defined in terms of a second color space. A color space may be defined as a multi-dimensional space, with each point in the multi-dimensional space corresponding to a color value and dimensions of the space representing variables representing the color in the color space. For example, in a Red, Green, Blue (RGB) color space, an additive color model defines three variables representing different quantities of red, green and blue. Another example of a color space is a Cyan, Magenta, Yellow and BlacK (CMYK) color space, in which four variables are used in a subtractive color model to represent different quantities of colorant for a printer system.

The color output of a printer system may be controlled by an area coverage representation of a color, defined in terms of a color space associated with the printer system. For example, a given color may be represented as a specified area coverage of one or more Neugebauer Primaries (NPs) and an example of a representation is the NP area coverage (NPac) space. In this context, each NP defines the content of a print-level pixel in terms of a combination of one or more colorants in a set of colorants available to the printer system (e.g. CMYK colorants). The NPac space may be used to generate color separated halftones corresponding to the set of colorants available to the printer system, thereby representing the color.

In some examples, a given NPac vector in the NPac space specifies one or more area coverage parameters which represent a statistical distribution of one or more respective NPs available to the printer system over an area of a the halftone. For example, a binary printer system utilizing CMY colorants may be associated with a set of eight possible NPs: C, M, Y, CM, CY, MY, CMY, and W (white or blank indicating an absence of colorant). In this context, the set of possible NPs represents the set of possible colorant states for an addressable location on a print medium (e.g. a printable "pixel"), and each NPac vector defines the probability distribution for the set of possibly NPs for each pixel in an area of a halftone (i.e. a likelihood that a particular colorant combination is to be placed at a particular pixel in an area of the halftone). In this manner, an NPac vector may be considered as defining a set of halftone parameters that can be used in a halftone process to control statistical distribution of one or more NPs over the plurality of pixels of a halftone. Accordingly, the statistical distribution of NPs to pixels in the halftone serves to control the colorimetry and other print characteristics of the halftone, when printed on a print medium.

As an example, a first NPac vector defined as V1=[Y: 0.3] specifies that the probability that a given pixel in a corresponding area of the halftone comprises the Y NP (i.e. yellow colorant only) is 30 percent. Similarly, a second NPac vector defined as V2=[Y: 0.3, CY: 0.2] specifies that the probability that a given pixel in an area of the halftone comprises the Y NP (i.e. yellow colorant only) is 30 percent and the probability that a given pixel in the same area of the halftone comprises the CY NP (i.e. cyan and yellow colorants only) is 20 percent. In both examples, it is implicit that the probability of other NPs available to the printer system is zero. However, in other examples, the zero probability of other NPs available to the printer system may be specified explicitly in the NPac vector, such that a third NPac vector defined as V3=[C: 0.0, M: 0.0, Y: 0.3, CM: 0.0, CY: 0.0, MY: 0.0, CMY: 0.0, W: 0.7] is equivalent to the first NPac vector V1 as defined above.

Spatial distribution of the NPs in the halftone in accordance with the probability distribution specified in the NPac vector may be performed using matrix-selector-based PARAWACS (Parallel Random Area Weighted Area Coverage Selection) techniques, or techniques based on error diffusion, as are known in the art. An example of a printer system that uses area coverage representation of colors for halftone generation is a printer system based on a Halftone Area Neugebauer Separation (HANS) imaging pipeline.

In some examples, a printer system may comprising a plurality of rant deposition subsystems, such as a plurality of page wide arrays or print-bars, which enable deposition of multiple drops of colorant at each pixel location in a halftone. In such systems, NPs may be defined separately and independently for each print-bar (i.e. "print-bar specific" NPs may be defined) and colors may be represented in terms of "print-bar aware" NPac vectors (i.e. NPac vectors which specify area coverage parameters for one or more print-bar specific NPs). For example, a binary printer system comprising three print-bars each utilizing CMY colorants may be associated with a set of twenty four print-bar specific NPs: $C_1$, $M_1$, $Y_1$, $C_1M_1$, $C_1Y_1$, $M_1Y_1$, $C_1M_1Y_1$, and $W_1$; $C_2$, $M_2$, $Y_2$, $C_2M_2$, $C_2Y_2$, $M_2Y_2$, $C_2M_2Y_2$, and $W_2$; and $C_3$, $M_3$, $Y_3$, $C_3M_3$, $C_3Y_3$, $M_3Y_3$, $C_3M_3Y_3$, and $W_3$, where the subscripts indicate the print-bar index. In such systems, the print-bar aware NPac space represents the statistical distribution of the print-bar specific NPs over an area of a halftone, and a given print-bar aware NPac vector may be considered as defining a set of halftone parameters for use in a halftone process to statistically distribute one or more print-bar specific NPs over the plurality of pixels for an area of the halftone. In other words, a print-bar aware NPac vector defines a set of halftone parameters that can be used in a halftone process to produce a halftone comprising a plurality of print-bar specific halftones which, in combination, represent the color associated with the given print-bar aware NPac vector.

As an example, a fourth print-bar aware NPac vector defined as V4=[$Y_1$: 0.2, $Y_2$: 0.2, $Y_3$: 0.2] specifies that the probability that a given pixel in an area of the halftone comprises the $Y_1$ NP (i.e. yellow colorant deposited by the first print-bar) is 20 percent, the probability that a given pixel in an area of the halftone comprises the $Y_2$ NP (i.e. yellow colorant deposited by the second print-bar) is 20 percent, and the probability that a given pixel in an area of the halftone comprises the $Y_3$ NP (i.e. yellow colorant deposited by the third print-bar) is 20 percent. Similarly, a fifth print-bar aware NPac vector defined as V5=[$Y_1$: 0.2, $Y_2$: 0.2, $Y_3$: 0.2, $CY_1$: 0.1, $CY_2$: 0.1, $CY_3$: 0.1] specifies that the probabilities that a given pixel in an area of the halftone comprises Y NP (i.e. yellow, colorant) deposited by each of the first, second and third print-bars area is 20 percent respectively, and the probabilities that a given pixel in an area of the halftone comprises CY NP (i.e. cyan and yellow colorant) deposited by each of the first, second and third print-bars area is 10 percent respectively.

The output of a particular print-bar may change with respect to a reference output over time due to print-head wear, environmental conditions, and other transient factors. For example, in the case of ink-jet printer system, the output of a particular print-bar may change due malfunctioning nozzles and/or to changes in the drop weight (i.e. the amount of ink deposited by each nozzle in the print-bar). This variation in output may be quantified on a per-print-bar and per-NP basis using a calibration process.

In the case of an ink-jet printer system comprising a plurality of print-bars, an example calibration process comprises: (i) print all print-bar specific NPs utilized in the NPac space using the printer system at the ink limit and using the smallest drop weights for which calibration is to be performed; (ii) measure one or more optical properties of the printed print-bar specific NPs and convert the measured optical properties into area coverages defined in an area coverage linear domain (e.g. a Yule-Nielsen Y domain); and (iii) calculate the ratio of the measured area coverage defined in the area coverage linear domain to a reference area coverage for the each print-bar specific NP to determine a change between the reference state and the current state of the printer system.

The result of the above calibration technique is, for each NP available to the printer system, a calibration vector comprising a set calibration parameters which quantify the NP coverage for each print-bar under current conditions relative to the NP coverage for each print-bar under reference conditions. For example, a calibration vector defined as $R_Y=[r_{Y1}, r_{Y2}, r_{Y3}]=[1.2, 0.9, 0.8]$ for printer system comprising three, print-bars specifies that the area coverage for the $Y_1$ NP (i.e. Y deposited by the first print-bar) under current conditions is 20 percent greater than the area coverage under reference conditions, the area coverage for the $Y_2$ NP (i.e. Y deposited by the second print-bar) under current conditions is 10 percent less than the area coverage under reference conditions, and the area coverage for the $Y_3$ NP (i.e. Y deposited by the third print-bar) under current conditions is 20 percent less than that under reference conditions.

These calibration parameters may be used to calibrate a printer system on a per-NP and per-print-bar basis, whereby each print-bar is effectively calibrated as a separate printer system. For example, the reference area coverage parameters for a given print-bar specific NP specified in a print-bar aware NPac vector may be scaled by the inverse of the respective calibration parameter to compensate for the change in output for the print-bar specific NP relative to the reference state. However, according to this approach each print-bar is calibrated independently in respect of the NPac vector, which may result in accelerated wear and ultimately failure of the associated print-head, due to the additional load imposed by the calibrated NPac vector.

Certain examples described herein relate to techniques for color calibration in printer system comprising a plurality of print-bars, which alleviate the issues discussed above. In particular, certain examples provide techniques for color calibration according to which changes in NP output with respect to reference conditions are distributed or balanced across the plurality of pint-bars in a calibration process to produce calibrated print-bar aware NPac vectors which closely match the colorimetry of the corresponding print-bar aware NPac vectors under reference conditions.

FIG. 1 shows an example of an imaging pipeline 100 for a printer system. The imaging pipeline 100 comprises a color separation process 102 and a halftone process 104, which together function to generate control data 106 for control of a colorant deposition system 108 comprising a plurality of print-bars 110. In this respect, the color separation process 102 receives image data 112 which represents an image in terms of an input color space. For example, the image data 112 may represent the image as a plurality of image-level pixels defined in terms of an RGB color space. The color separation process 102 maps the image data from the input color space to an area coverage space specified in terms of an output color space associated with the colorant deposition system 108. In this example, the area coverage space is a print-bar aware NPac space which is defined in terms of the CMYK colorants available to each print-bar 110 in the colorant deposition system 108. In this sense, the print-bar aware NPac color space represents a domain within which the color separation process 102 and the halftone process 104 communicate. In other words, a color output by the color separation process 102 is defined in terms of an area coverage representation, which in turn represents a set of halftone parameters for use by the halftone process 104 to assign print-bar specific NPs to a halftone.

Mapping between the input color space and the output color space via the area coverage space is achieved using a print-bar aware NPac lookup table 114, which defines mappings between colors defined in the input color space and corresponding print-bar aware NPac vectors defined in terms the output color space. Specifically, the print-bar aware NPac lookup table 114 defines print-bar aware NPac vectors which have been calibrated according to a calibration process to balance changes in NP output on a per-print-bar basis, relative to a reference state. In this respect, the print-bar aware NPac vectors have been calibrated to distribute an overall change in output for a given NP across the plurality of print-bars 110, to thereby compensate in the change in output for the NP with minimal impact on print quality. Further details of this calibration process are provided below with reference to FIGS. 2 to 5.

The halftone process 104 uses the calibrated area coverage parameters defined in the print-bar aware NPac vectors resulting from the color separation process 102 to generate the control data 106 representing a plurality of print-bar specific halftones corresponding to the plurality of print-bars 110 in the colorant deposition system 108. In this respect, the halftone process 104 is configured to distribute the proportions of each print-bar specific NP across an area of the corresponding print-bar specific halftone in accordance with the corresponding calibrated area coverage parameters specified in a given print-bar aware NPac vector. For example, where a given print-bar aware NPac vector specifies a set of area coverage parameters as $V6=[Y_1: 0.1, Y_2: 0.2, Y_3: 0.3]$ for a given image-level pixel, the halftone process assigns the $Y_1$ NP (i.e. yellow colorant deposited by the first print-bar) to 10 percent of printer-level pixels in a corresponding area of the print-bar specific halftone associated with the first print-bar, assign the $Y_2$ NP (i.e. yellow colorant deposited by the second print-bar) to 20 percent of printer-level pixels in a corresponding area of the print-bar specific halftone associated with the second print-bar, and assign the $Y_3$ NP (i.e. yellow colorant deposited by the third print-bar) to 30 percent of printer-level pixels in a corresponding area of the print-bar specific halftone associated with the third print-bar. As discussed above, spatial distribution of the print-bar specific NPs according to the probabilities specified in the print-bar aware NPac vector may be performed using a matrix-selector-based PARAWACS (Parallel Random Area Weighted Area Coverage Selection) techniques or techniques based on error diffusion.

Figure 2:
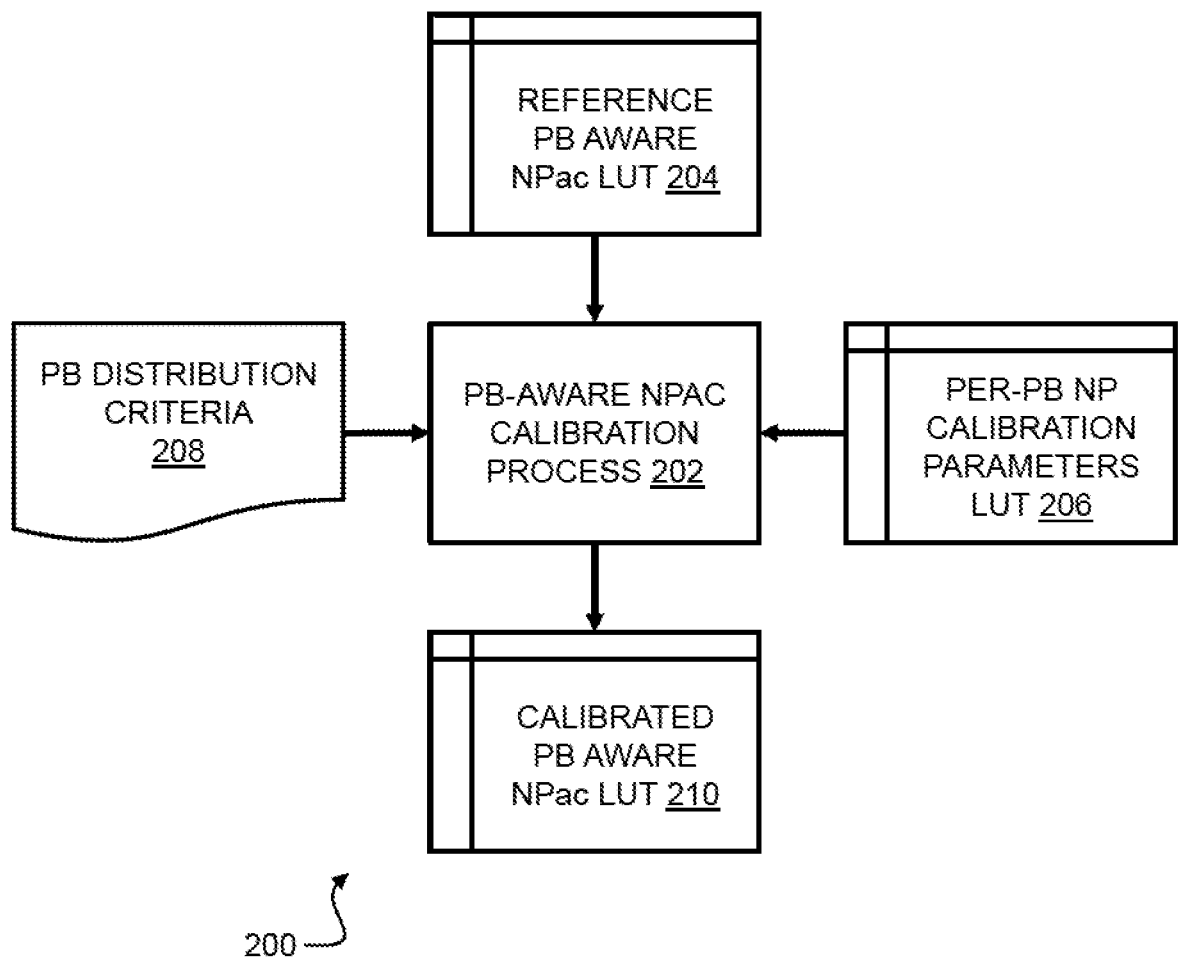
FIG. 2 is a schematic diagram showing a calibration pipeline in accordance with an example.

FIG. 2 shows an example of a calibration pipeline 200 for generating the calibrated print-bar aware NPac look-up table used in the imaging pipeline 100 discussed above with reference to FIG. 1. The calibration pipeline 200 comprises a calibration process 202 which is configured to calibrate a plurality of reference print-bar NPac vectors to generate a plurality of calibrated print-bar aware NPac vectors.

The calibration process 202 is provided with access to a first look-up table 204 which defines a mapping between colors defined in the input color space and corresponding print-bar NPac vectors defining representations of those colors in the print-bar aware NPac space. In this context each print-bar aware NPac vector defined in the first look up table 204 comprises a plurality of area coverage parameters which are specified under reference conditions (i.e. reference area coverage parameters). In other words, each print-bar aware NPac vector specifies a set of reference area coverage parameters which specify an area coverage for a corresponding set of print-bar specific NPs which, under reference conditions, accurately represented the associated color. In some examples, the reference area parameters may be determined during an initial set-up process for the printer system (e.g. a factory set-up for the printer system) or as the result of a subsequent calibration process.

The calibration process 202 is also provided with access to a second look-up table 206 which specifies calibration parameters for each print-bar specific NP available to the printer system. As discussed above, each calibration parameter characterizes a change in output coverage for the respective print-bar specific NP, relative to a reference output for the print-bar specific NP under reference conditions. In other words, the calibration parameters provide a measure of how the area coverage of each print-bar specific NP under current conditions has changed relative to the reference conditions for which the print-bar aware NPac vectors in the first look-up table are specified.

The calibration process 202 uses the calibration parameters to determine a change in total or overall area coverage for each NP defined in a given print-bar aware NPac vector. This change in total area coverage represents a change in the amount of colorant which is deposited on print medium and thus corresponds in a change in colorimetry for the given print-bar aware NPac vector, relative to the reference conditions. Thus, in order to compensate for this change, the calibration process 202 is configured to adjust the set of reference area coverage parameters for the print-bar specific NP in the given NPac vector to produce a corresponding set of calibrated area coverage parameters, which are subsequently stored in a third look-up table 210. In this manner, the NPac calibration process ensures that the total area coverage of the given NP in the calibrated print-bar aware NPac vector under current conditions is approximately the same as the total area coverage of the given NP under reference conditions. As a consequence, the colorimetry for the calibrated print-bar aware NPac vector under current conditions is calibrated to closely match the colorimetry of the reference print-bar aware NPac vector under the reference conditions.

The calibration process 202 is configured to determine the calibrated area coverage parameters by distributing the change in total area coverage for each NP across the plurality of print-bars. This distribution may be performed on the basis of one or more print-bar distribution criteria 208, which define how the change in total area coverage should be distributed across the plurality of print-bars. In this respect, the print-bar distribution criteria may for example specify that (i) the change in total area coverage for the NP is to be distributed to the plurality of print-bars in proportion to their respective reference area coverage parameters in the print-bar aware NPac vector; (ii) the change in total area coverage for the NP is to be distributed to the plurality of plurality of print-bars in proportion to their respective calibration parameters for the NP; (iii) the change in total area coverage for the NP is to be distributed to the plurality of print-bars based on status information for the plurality of print-bars (e.g. health, usage and/or age information); or (iv) the change in total area coverage for the NP is to be assigned to the print-bar associated with the largest calibration parameter, thereby ensuring that the calibrated area coverage parameters deviate from the reference area control parameters by a minimum amount. These print-bar distribution criteria are discussed in more detail below with reference to FIG. 3.

Figure 3:
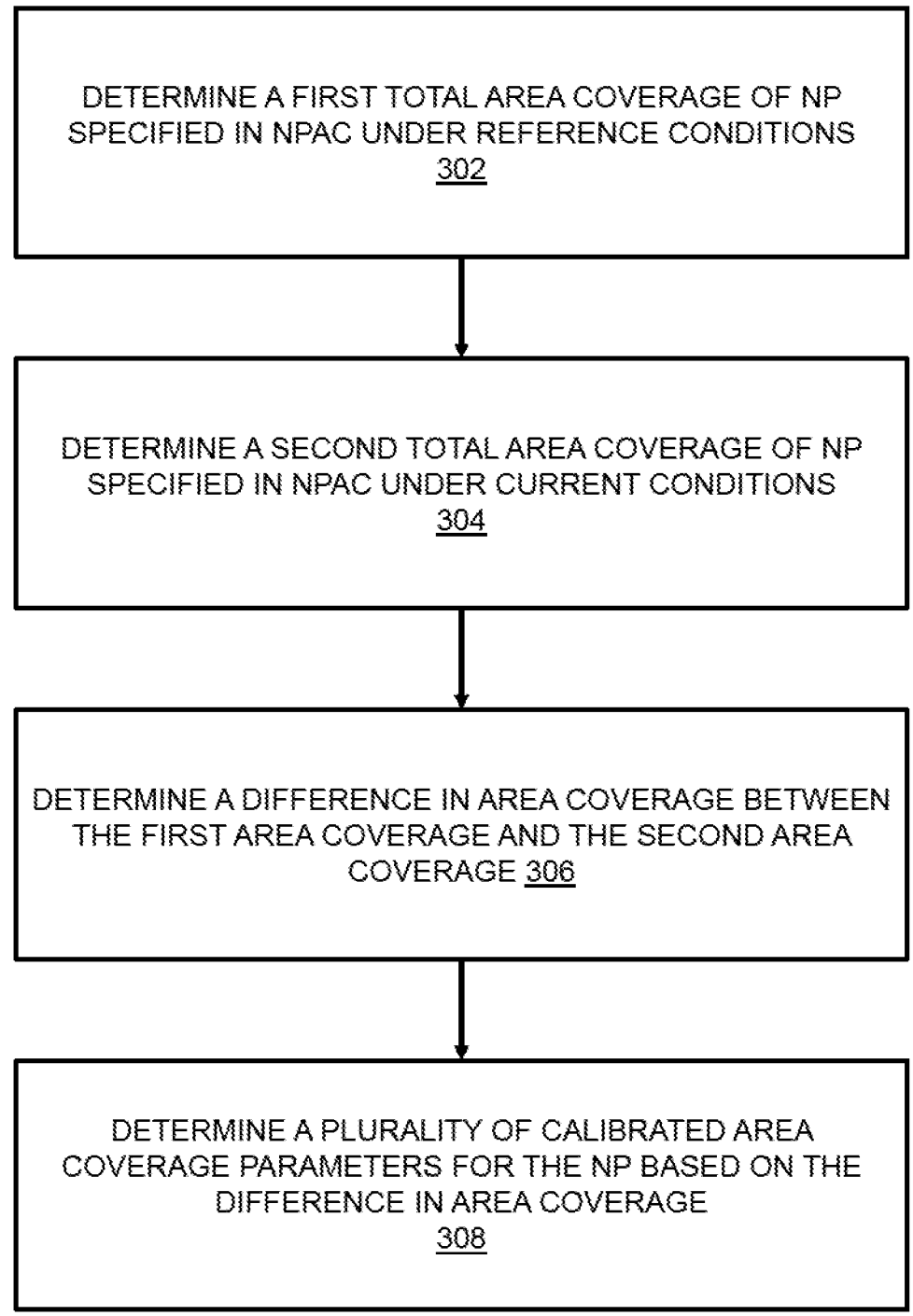
FIG. 3 is a flow diagram showing a method of calibrating an area coverage representation of a color in accordance with an example.

FIG. 3 shows an example of a method 300 performed by the calibration process 202 to calibrate the area coverage parameters for a NP specified in a particular print-bar aware NPac vector. In this respect, it will be understood that the method 300 of FIG. 3 may be repeated for each NP specified in the particular print-bar aware NPac vectors, and for all print-bar aware NPac vectors defined for the printer system, to thereby generate a calibrated print-bar aware NPac look-up table for the printer system.

In block 302, the calibration process 202 determines a first total area coverage of the NP in the particular reference print-bar aware NPac representation of a color, based on a plurality of reference area coverage parameters specified for the NP in the particular reference print-bar aware NPac. As discussed, each reference area coverage parameter in the plurality of reference area coverage parameters corresponds to a respective print-bar in the plurality of print-bars for the printer system. Thus, for a particular reference print-bar aware NPac vector defined in the first look-up table 204, the calibration process determines the current area coverage for the NP specified for at least one of the print-bars by summing the corresponding reference area coverage parameters. In some examples, where the NP is specified for only a subset of print-bars in the plurality of print-bars, the NP vector may be augmented to include zero value area coverages for the unspecified print-bars.

To elaborate on block 302, consider the case where the reference print-bar aware NPac vector is the fifth print-bar aware NPac vector discussed above and defined as V5=[$Y_1$: 0.2, $Y_2$: 0.2, $Y_3$: 0.2, $CY_1$: 0.1, $CY_2$: 0.1, $CY_3$: 0.1]. In this case, we consider the Y NP, which is associated with a set of reference area coverage parameters $C_Y$=[$c_{Y1}$, $c_{Y2}$, $c_{Y3}$]= [0.2, 0.2, 0.2]. In this case, the total area coverage for the Y NP in the print-bar aware NPac vector under reference conditions is calculated as $c_{Y1}+c_{Y2}+c_{Y3}$=0.2+0.2+0.2=0.6 (i.e. 60 percent).

At block 304, the calibration process 202 determines a second total area coverage of the given NP based on the plurality of reference area coverage parameters and a plurality of calibration parameters for the NP corresponding to the plurality of print-bars in the printer system. In this respect, the calibration process 202 is configured to scale the reference parameters specified in the NPac vector according to the calibration parameters defined in the calibration vector to determine the actual output of the Y NP under current conditions. This second total area coverage represents the area coverage of the given NP resulting from the print-bar aware NPac in the case where no calibration is performed.

Thus, to continue the example provided above in relation to block 302, in a case where the second look-up table 206 specifies a calibration vector for the Y NP as $R_Y$=[$r_{Y1}$, $r_{Y2}$, $r_{Y3}$]=[1.2, 0.9, 0.8], the actual output of the Y NP in the print-bar aware NPac vector defined as V5 under current conditions is calculated as $R_Y C_Y$=[$r_{Y1}c_{Y1}$, $r_{Y2}c_{Y2}$, $r_{Y3}c_{Y3}$]= [0.24, 0.18, 0.16], and the total area coverage for the Y NP defined in the print-bar aware NPac vector defined as V5 under current conditions is $r_{Y1}c_{Y1}+r_{Y2}c_{Y2}+r_{Y3}c_{Y3}$=0.24+ 0.18+0.16=0.58 (i.e. 58 percent).

At block 306, the calibration process 202 determines a change or difference in area coverage between the first area coverage and the second area coverage for the NP specified in the print-bar aware NPac. In other words, the calibration process determines the change in area coverage for the NP in relation to the print-bar NPac between the reference state and the current state.

To continue the example provided above in relation to blocks 302 and 304, the change in area cover for the V NP in NPac vector V5 is determined as d=($c_{Y1}+c_{Y2}+c_{Y3}$)− ($r_{Y1}c_{Y1}+r_{Y2}c_{Y2}+r_{Y3}c_{Y3}$)=0.6−0.58=0.02. In other words, the actual area coverage output of the Y NP in the print-bar aware NPac under current conditions is 2 percent less than the output of the Y NP in the print-bar aware NPac under reference conditions.

At block 308, the calibration process 202 determines a plurality of calibrated area coverage parameters for the NP in the print-bar aware NPac vector based on the plurality of reference area coverage parameters, the plurality of calibration parameters and a difference in area coverage between the first area coverage and the second area coverage as determined in block 306. As discussed above with reference to FIG. 2, the calibration process determines the calibrated area coverage parameters by distributing the change in total area coverage for the NP in the print-bar NPac vector across the plurality of print-bars based on one or more distribution criteria.

In some examples, the distribution criteria may specify that the change in area coverage is to be distributed across the plurality of print-bars in proportion to the reference area coverages defined in the reference print-bar aware NPac vector. Thus, for each print-bar i in the plurality of print bars, the calibrated area coverage parameter may be determined according to:

$$c'_i = c_i + \frac{1}{r_i}\left(d \times \frac{c_i}{\sum c_i}\right)$$

wherein $c'_i$ is the calibrated area coverage parameter, $c_i$ is the reference area coverage parameter, $r_i$ is the calibration parameter and d is the difference in area coverage. Thus, to continue the example provided above in relation to blocks 302 to 306, the calibrated area coverage parameters for the print-bar aware NPac vector defined by V5 are determined as $C'_Y$=[$c'_{Y1}$, $c'_{Y2}$, $c'_{Y3}$]=[0.2055, 0.2074, 0.2083] which, under current conditions, results in a total area coverage of 0.6 for the Y NP for the calibrated print-bar aware NPac vector (i.e. $r_{Y1}c'_{Y1}+r_{Y2}c'_{Y2}+r_{Y3}c'_{Y3}$=0.6).

In some examples, the distribution criteria may specify that the change in area coverage may be distributed across the plurality of print-bars in proportion to their respective calibration parameters, thereby ensuring that print-bars which are associated with greater output under current conditions relative to the reference conditions compensate for more of the difference in total area coverage. Thus, for each print-bar i in the plurality of print bars, the calibrated area coverage parameter may be determined according to:

$$c'_i = c_i + \frac{1}{r_i}\left(d \times \frac{r_i}{\sum r_i}\right) = c_i + \frac{d}{\sum r_i}$$

wherein $c'_i$ is the calibrated are coverage parameter, $c_i$ is the reference area coverage parameter, $r_i$ is the calibration parameter and d is the difference in area coverage. Thus, to continue the example provided above in relation to blocks 302 to 306, the calibrated area coverage parameters for the example NPac vector defined by V5 are determined as $C'_Y$=[$c'_{Y1}$, $c'_{Y2}$, $c'_{Y3}$]=[0.2069, 0.2069, 0.2069] which, under current conditions, results in a total area coverage of 0.6 for the Y NP for the calibrated print-bar aware NPac vector (i.e. $r_{Y1}c'_{Y1}+r_{Y2}c'_{Y2}+r_{Y3}c'_{Y3}$=0.6).

In some examples, the distribution criteria may specify that the change in total area coverage for the NP is to be distributed to the plurality of print-bars based on one or more external change ratios. For example, the external change ratios may reflect status information for the plurality of print-bars (e.g. health, usage and/or age information) and therefore enable the calibration process to favour one print-bar over another print-bar specified by a user or administrator.

In some examples, the distribution criteria may specify that the change in total area coverage for the NP is to be assigned to the print-bar associated with the largest calibration parameter, thereby ensuring that the calibrated area coverage parameters deviate from the reference area control parameters by a minimum amount. In the case of the example NPac vector V5 defined above, the first print-bar is associated with the largest calibration parameter for the Y NP (i.e. $r_{Y1}$=1.2) and the total change in area coverage of 0.02 for the Y NP is equivalent to a change in area coverage of 0.0167 for the first print-bar under reference conditions (i.e. 0.02÷1.2). Accordingly, the calibrated area coverage parameters for the example NPac vector are determined as $C'_Y$=[$c'_{Y1}$, $c'_{Y2}$, $c'_{Y3}$]=[0.2167, 0.20, 0.20] which, under current conditions, results in a total area coverage of 0.6 for the Y NP for the calibrated print-bar aware NPac vector (i.e. $r_{Y1}c'_{Y1}$+$r_{Y2}c'_{Y2}$+$r_{Y3}c'_{Y3}$=0.6). According to this distribution, the area coverage of associated with the first print-bar is increased by approximately 1.7 percent (i.e. an increase of 0.02÷1.2=0.0167 in absolute terms), whereas distribution of the change in area coverage to the third print-bar would result in an increase in area coverage for the third print-bar of approximately 2.5 percent (i.e. an increase of 0.02÷0.8=0.02505 in absolute terms). In the case of an ink-based printer system, this distribution would result in the minimum increase in overall firing frequency for individual print-heads for the plurality of print-bars, and therefore avoids undue stress of the third print-bar.

It will be appreciated that the method 300 discussed above may be repeated for each NP specified in the reference print-bar aware NPac vector. Thus, for the example NPac vector V5 defined as V5=[$Y_1$: 0.2, $Y_2$: 0.2, $Y_3$: 0.2, $CY_1$: 0.1, $CY_2$: 0.1, $CY_3$: 0.1] the method 300 may be performed independently for the Y NP and the CY NP.

Once the calibrated area coverage parameters for one or more NPs defined in the print-bar aware NPac vector have been determined, a calibrated print-bar aware NPac vector may be formed and stored in the third look-up table 210 by the calibration process 202. In other examples, the calibration process may update the first look-table table 204 using the calibrated area coverage parameters and without using the third look-up table.

Figure 4:
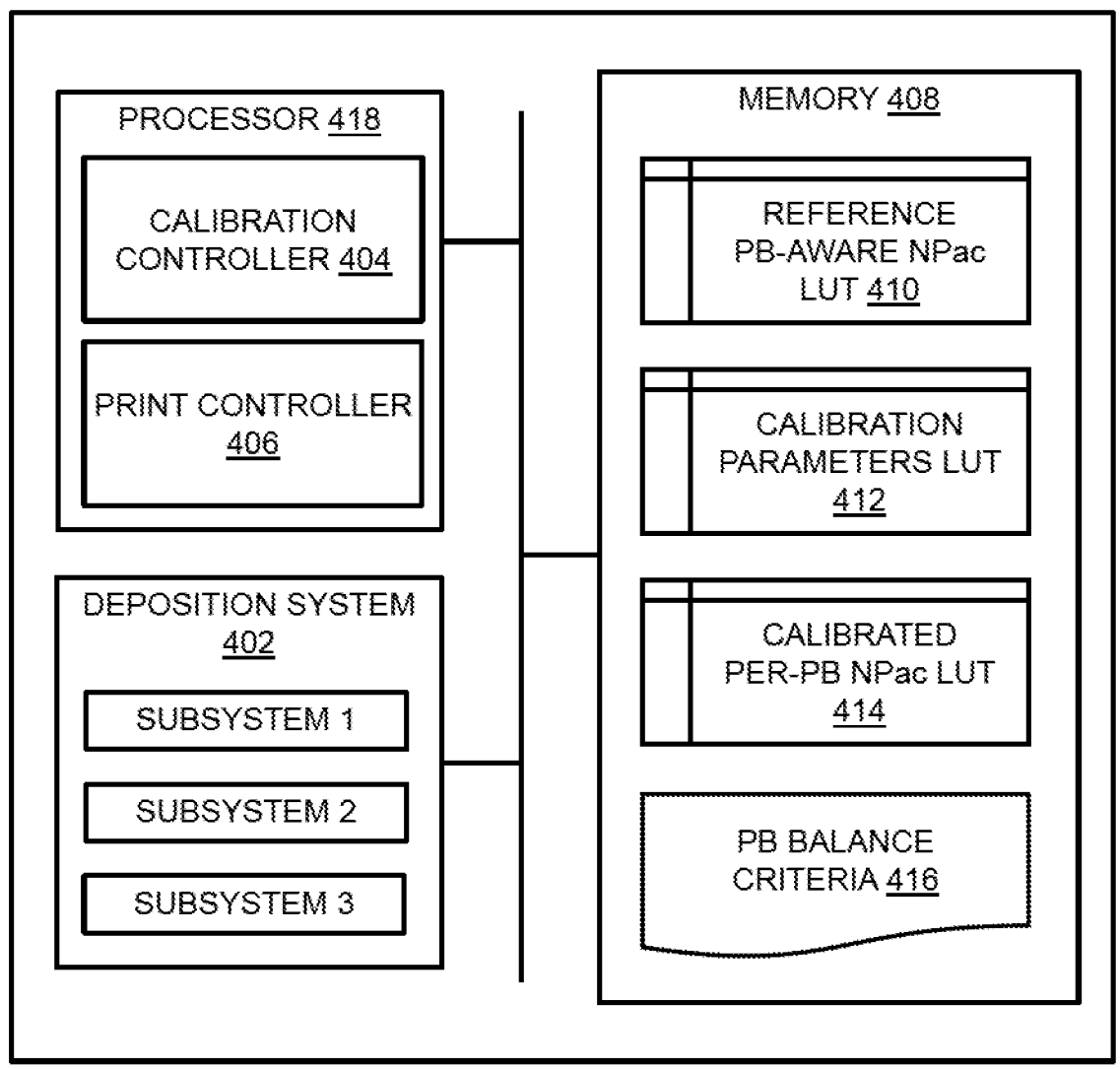
FIG. 4 is a schematic diagram showing an apparatus in accordance with an example.

FIG. 4 is a schematic diagram showing a printer system 400 according to an example. The printer system 400 includes a colorant deposition system 402 comprising a plurality of colorant deposition subsystems to deposit a plurality of base colorants. In some examples, each colorant deposition subsystem may correspond to a respective print-bar or page wide array comprising a plurality of inkjet nozzles configured to deposit a plurality color inks onto a print medium.

The printer system 400 further comprises a calibration controller 404 and a print controller 406. The calibration controller 404 and the print controller 406 may be implemented by one or more instructions executed by a processor 418. The processor 418 may be a microprocessor, a general purpose processor, a digital signal processor (DSP), an application specific integrated circuit (ASIC), a field programmable gate array (FPGA) or other programmable logic device, a discrete gate or transistor logic, discrete hardware components, or any suitable combination thereof designed to perform the functions described herein. The processor 418 may also be implemented as a combination of computing devices, e.g., a combination of a DSP and a microprocessor, a plurality of microprocessors, one or more microprocessors in conjunction with a DSP core, or any other such configuration.

The printer system 400 comprises a memory system 408, which may include at least one of volatile memory, such as a random access memory (RAM) and at least one non-volatile memory, such as read-only memory (ROM) or a solid state drive (SSD) such as flash memory. In some examples, the memory system 408 may include further storage devices, for example magnetic, optical or tape media, compact disc (CD), digital versatile disc (DVD) or other data storage media. One or more parts of memory system 408 may be removable or non-removable from the printer system 400. The memory system 408 stores first data 410 defining a reference print-bar aware NPac vector look-up table, second data 412 defining a per-print-bar calibration parameter look-up table, third data 414 defining a calibrated print-bar aware NPac vector look-up table, and fourth data 416 defining print-bar balance criteria for the calibration process.

In some examples, the print controller 406 is configured to implement the imaging pipeline described above with reference to FIG. 1. For example, the print controller 406 may generate halftone data representing a color using the a plurality of calibrated area coverage parameters retrieved from the third data structure 414 in respect of a print-bar aware NPac representation of the color. In some examples, the halftone data may be used to control the plurality of colorant deposition subsystems provided by the colorant deposition system 402 based on the halftone data generated by the print controller 406. In this respect, the halftone data may specify a plurality of a plurality of halftones, with each halftone in the plurality of halftones being generated on the basis of a respective calibrated area coverage parameter in the plurality of calibrated area coverage parameters and corresponding to a respective colorant deposition subsystem in the plurality of colorant deposition subsystems.

In some examples, the calibration controller 404 is configured implement the calibration pipeline described above with reference to FIG. 2. For example, the calibration controller 404 may access the first data structure 410 to retrieve a plurality of reference area coverage parameters associated with a NP specified in a given print-bar aware NPac representation of a color. In this respect, the each of the retrieved reference area coverage parameters corresponds to a respective colorant deposition subsystem in the colorant deposition systems 402. The calibration controller 404 determines a first area coverage of the NP based on the plurality of reference area coverage parameters and determines a second area coverage of the NP based on the plurality of reference area coverage parameters and a plurality of respective calibration parameters for the NP retrieved from the second data structure 412. Once the first and second area coverages have been determined, the calibration controller 404 may generate a plurality of calibrated area coverage parameters for the NP in the area coverage representation of the color, based on the plurality of reference area coverage parameters, the plurality of calibration parameters and a difference in area coverage between the first area coverage and the second area coverage, and store the plurality of calibrated area coverage parameters in the third data structure 414.

According to some examples, the printer system 400 may be a three-dimensional (3D) printer system that deposits colorants onto a build material in a print bed. In such examples, the colorant deposition system 402 may be configured to deposit the colorants at addressable locations in a three-dimensional addressable space (e.g. voxels) under the control of the print controller 402.

Figure 5:
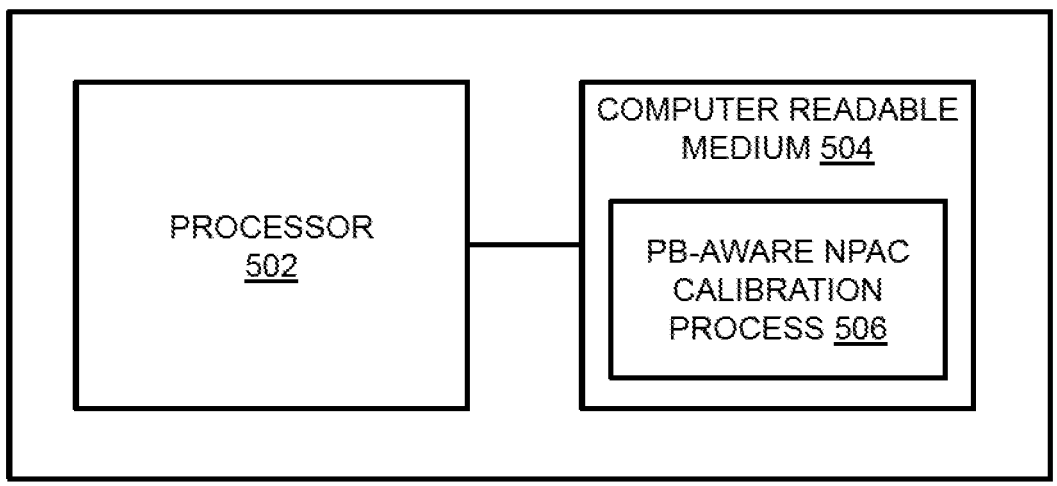
FIG. 5 is a schematic diagram showing a computer readable medium in accordance with an example.

Certain methods and systems as described herein may be implemented by a processor that processes computer-executable instructions (e.g. computer program code) that are stored in a non-transitory computer readable medium. In this respect, FIG. 5 shows an example of a system 500 comprising a processor 502 which is coupled to a non-transitory computer readable medium 502 which stores instructions 506 to implement the calibration process 202 of FIG. 2. In some examples the system 500 may include a colorant deposition system comprising a plurality of colorant deposition subsystems (not shown). The non-transitory computer readable medium 504 may be any medium that can contain, store, or maintain programs and data for use by or in connection with an instruction execution system. The computer readable medium 504 may include any one of many physical media such as, for example, electronic, magnetic, optical, electromagnetic, or semiconductor media. More specific examples of suitable computer readable media include, but are not limited to, a hard drive, a random access memory (RAM), a read-only memory (ROM), an erasable programmable read-only memory, or a portable disc.

In FIG. 5, the instructions 506 stored in non-transitory computer readable medium 504 are executable by the processor 502 to cause the system 500 to perform a calibration process for each NP specified in an area coverage representation of a color. In this respect, the instructions 506 are executable by the processor 502 to cause the system to determine a first area coverage of the NP based on a plurality of reference area coverage parameters for the NP, wherein each reference area coverage parameter in the plurality of reference area coverage parameters corresponds to a respective colorant deposition subsystem in the plurality of colorant deposition subsystems; determine a second area coverage of the NP based on the plurality of reference area coverage parameters and a plurality of calibration parameters for the NP, wherein each calibration parameter in the plurality of calibration parameters corresponds to a respective colorant deposition subsystem in the plurality of colorant deposition subsystems; and determine a plurality of calibrated area coverage parameters for the NP in the area coverage representation of the color based on the plurality of reference area coverage parameters, the plurality of calibration parameters and a difference in area coverage between the first area coverage and the second area coverage.

The preceding description has been presented to illustrate and describe examples of the principles described. This description is not intended to be exhaustive or to limit these principles to any precise form disclosed. Many modifications and variations are possible in light of the above teaching.

What is claimed is:

1. A method of calibrating an area coverage representation of a color, the method comprising:
   determining a first area coverage of a Neugebauer primary in an area coverage representation of a color based on a plurality of reference area coverage parameters for the Neugebauer primary, wherein each reference area coverage parameter in the plurality of reference area coverage parameters corresponds to a respective colorant deposition subsystem in a plurality of colorant deposition subsystems;
   determining a second area coverage of the Neugebauer primary based on the plurality of reference area coverage parameters and a plurality of calibration parameters for the Neugebauer primary, wherein each calibration parameter in the plurality of calibration parameters corresponds to a respective colorant deposition subsystem in the plurality of colorant deposition subsystems;
   determining a plurality of calibrated area coverage parameters for the Neugebauer primary in the area coverage representation of the color based on the plurality of reference area coverage parameters, the plurality of calibration parameters and a difference in area coverage between the first area coverage and the second area coverage;
   generating control data based on the plurality of calibrated area coverage parameters; and
   controlling a colorant deposition system, including the plurality of colorant deposition subsystems, using the generated control data.

2. The method of claim 1, wherein determining the plurality of calibrated area coverage parameters for the Neugebauer primary in the area coverage representation of the color comprises:
   distributing the difference in area coverage to the plurality of calibrated area coverage parameters in proportion to the plurality of reference area coverage parameters.

3. The method of claim 1, wherein for each colorant deposition stage i in the plurality of colorant deposition subsystems, the calibrated area coverage parameter is determined according to:

$$c'_i = c_i + \frac{1}{r_i}\left(d \times \frac{c_i}{\sum c_i}\right)$$

wherein $c'_i$ is the calibrated area coverage parameter, $c_i$ is the reference area coverage parameter, $r_i$ is the calibration parameter and d is the difference in area coverage.

4. The method of claim 1, wherein determining the plurality of calibrated area coverage parameters for the Neugebauer primary in the area coverage representation of the color comprises:
   distributing the difference in area coverage to the plurality of calibrated area coverage parameters in proportion to the plurality of calibration parameters.

5. The method of claim 1, wherein for each colorant deposition stage i in the plurality of colorant deposition stages, the calibrated area coverage parameter is determined according to:

$$c'_i = c_i + \frac{1}{r_i}\left(d \times \frac{r_i}{\sum r_i}\right)$$

wherein $c'_i$ is the calibrated are coverage parameter, $c_i$ is the reference area coverage parameter, $r_i$ is the calibration parameter and d is the difference in area coverage.

6. The method of claim 1, wherein determining the plurality of calibrated area coverage parameters for the Neugebauer primary in the area coverage representation of the color comprises:
   distributing the difference in the area coverage for the Neugebauer primary to the plurality of colorant deposition subsystems based on status information for the plurality of colorant deposition subsystems.

7. The method of claim 6, wherein the status information characterises the relative health of each colorant deposition subsystem in the plurality of colorant deposition subsystems.

8. The method of claim 1, wherein the Neugebauer primary specifies one or more colorants to be deposited at a print resolution pixel for the area coverage representation of the color.

9. The method of claim 1, wherein each reference area coverage parameter in the plurality of reference area coverage parameters represents a probability that a respective colorant deposition subsystem in the plurality of colorant deposition subsystems will deposit one or more colorants specified by the Neugebauer primary at a print resolution pixel.

10. The method of claim 1, wherein each calibration parameter in the plurality of calibration parameters characterises a difference between a reference area coverage for the Neugebauer primary and a measured area coverage for the Neugebauer primary printed using a respective colorant deposition subsystem in the plurality of colorant deposition subsystems.

11. The method of claim 1, further comprising modifying data representing a color-mapping look-up table based on the plurality of calibrated area coverage parameters to generate data representing a calibrated color mapping loop-up table, the color-mapping look-up table mapping an input color space to a Neugebauer primary area coverage space.

12. The method of claim 1, wherein:
the first area coverage is determined by summing the plurality of reference area coverage parameters; and
the second area coverage is determined by summing a plurality of compensated area coverage parameters,
wherein the plurality of compensated area coverage parameters are obtained by adjusting each reference area coverage parameter in the plurality of reference area coverage parameters by a respective calibration parameter in the plurality of calibration parameters.

13. The method of claim 1, wherein determining the plurality of calibrated area coverage parameters for the Neugebauer primary in the area coverage representation of the color comprises:
distributing the difference in area coverage to the plurality of calibrated area coverage parameters.

14. The method of claim 1, wherein the plurality of colorant deposition subsystems comprises a plurality of print-bars for each colorant.

15. A non-transitory computer-readable storage medium comprising computer-executable instructions which, when executed by a processor, cause a computing device to:
for each Neugebauer primary specified in an area coverage representation of a color:
determine a first area coverage of the Neugebauer primary based on a plurality of reference area coverage parameters for the Neugebauer primary, wherein each reference area coverage parameter in the plurality of reference area coverage parameters corresponds to a respective colorant deposition subsystem in the plurality of colorant deposition subsystems;
determine a second area coverage of the Neugebauer primary based on the plurality of reference area coverage parameters and a plurality of calibration parameters for the Neugebauer primary, wherein each calibration parameter in the plurality of calibration parameters corresponds to a respective colorant deposition subsystem in the plurality of colorant deposition subsystems; and
determine a plurality of calibrated area coverage parameters for the Neugebauer primary in the area coverage representation of the color based on the plurality of reference area coverage parameters, the plurality of calibration parameters and a difference in area coverage between the first area coverage and the second area coverage;
generate control data based on the plurality of calibrated area coverage parameters; and
control a colorant deposition system, including the plurality of colorant deposition subsystems, using the generated control data.

16. An apparatus comprising:
a plurality of colorant deposition subsystems to deposit a plurality of colorants on a print medium;
a processor; and
a memory storing computer-executable instructions which, when executed by the processor, cause the processor to:
receive first data representing a plurality of reference area coverage parameters associated with a Neugebauer primary specified in an area coverage representation of a color, wherein each reference area coverage parameter in the plurality of reference area coverage parameters corresponds to a respective colorant deposition subsystem in the plurality of colorant deposition sub systems;
determine a first area coverage of the Neugebauer primary based on a plurality of reference area coverage parameters for the Neugebauer primary;
determine a second area coverage of the Neugebauer primary based on the plurality of reference area coverage parameters and a plurality of calibration parameters for the Neugebauer primary, wherein each calibration parameter in the plurality of calibration parameters corresponds to a respective colorant deposition subsystem in the plurality of colorant deposition subsystems; and
generate second data representing a plurality of calibrated area coverage parameters for the Neugebauer primary in the area coverage representation of the color, based on the plurality of reference area coverage parameters, the plurality of calibration parameters and a difference in area coverage between the first area coverage and the second area coverage.

17. The apparatus of claim 16, wherein the computer-executable instructions, when executed by the processor, cause the processor to:
generate halftone data representing the color using the plurality of calibrated area coverage parameters represented by the second data; and
control the plurality of colorant deposition subsystems based on the halftone data;
wherein the halftone data specifies a plurality of halftones and each halftone in the plurality of halftones is generated on the basis of a respective calibrated area coverage parameter in the plurality of calibrated area coverage parameters, corresponding to a respective colorant deposition subsystem in the plurality of colorant deposition subsystems.

* * * * *